United States Patent Office 2,866,809
Patented Dec. 30, 1958

2,866,809

PROCESS OF PREPARING BETA-HALOALIPHATIC ESTERS OF HALOGEN SUBSTITUTED ACIDS OF PHOSPHORUS

Alfred J. Kolka, Birmingham, Mich., assignor to Ethyl Corporation, New York, N. Y., a corporation of Delaware No Drawing. Application August 5, 1954
Serial No. 448,159

10 Claims. (Cl. 260—461)

This invention relates to the manufacture of mono- and di-($\beta$-haloaliphatic)-esters of monomeric halogen substituted acids of phosphorus, that is, acids of phosphorus possessing one or two halogen atoms directly bonded to phosphorus.

The above esters fall within two categories, mono- and di-($\beta$-haloaliphatic)-esters of monomeric halogen substituted acids of trivalent phosphorus and the corresponding esters of pentavalent phosphorus. The former group consists of mono-($\beta$-haloaliphatic)-dihalophosphites, mono-($\beta$ - haloaliphatic) - dihalothiophosphites, di - ($\beta$ - haloaliphatic)-monohalophosphites and di-($\beta$-haloaliphatic)-monohalothiophosphites. Thus, these trivalent phosphorus esters are derived from the halo phosphorous acids $(HO)PX_2$, $(HS)PX_2$, $(HO)_2PX$, $(HO)(HS)PX$, and $(HS)_2PX$ where X represents a halogen atom. The latter group consists of mono - ($\beta$ - haloaliphatic) - dihalophosphates, mono - ($\beta$ - haloaliphatic) - dihalothiophosphates, mono - ($\beta$ - haloaliphatic) - dihalothionophosphates, mono - ($\beta$ - haloaliphatic) - dihalothiothionophosphates, di - ($\beta$ - haloaliphatic) - monohalophosphates, di - ($\beta$-haloaliphatic) - mono - halothiophosphates, di - ($\beta$ - haloaliphatic) - monohalothionophosphates, and di - ($\beta$ - haloaliphatic) - monohalothiothionophosphates, the prefix "thio" designating sulfur atoms which are singly bonded to phosphorus whereas "thiono" refers to a sulfur atom bonded to phosphorous by a coordinate covalent double bond. The above esters of pentavalent phosphorus are thus derivatives of the acids $(HO)P(O)X_2$, $(HS)P(O)X_2$, $(HO)P(S)X_2$, $(HS)P(S)X_2$, $(HO)_2P(O)X$, $(HO)(HS)$-$P(O)X$, $(HS)_2P(O)X$, $(HO)_2P(S)X$, $(HO)(HS)P(S)X$, and $(HO)_2P(S)X$.

The present esters are useful as chemical intermediates inasmuch as the halogen bonded to phosphorus is capable of reacting with a wide variety of chemical reagents such as organo alkali metal compounds and the like. It is thus possible to use the present esters in the synthesis of various plasticizers, flame proofing agents, agricultural chemicals, and the like.

An object of this invention is to provide a process for the manufacture of mono- and di-($\beta$-haloaliphatic-esters of monomeric halogen substituted acids of phosphorus. Another object is to provide an improved process for the manufacture of the aforesaid esters in which the aliphatic portions are substituted on the beta carbon atom with halogen atoms having an atomic weight between 30 and 80. Other objects will become apparent from the ensuing description.

According to this invention the above and other objects are accomplished by a process of preparing $\beta$–haloaliphatic esters of monomeric halogen substituted acids of phosphorus which comprises reacting at a temperature between about $-10°$ and about $100°$ C. in the presence of an amine as catalyst, an aliphatic compound of the formula

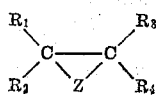

in which $R_1$, $R_2$, $R_3$, and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms; and Z is selected from the group consisting of oxygen and sulfur, with a phosphorus trihalide, said aliphatic compound being present in amount equal to that required to react with no more than two atoms of halogen per molecule of said phosphorus trihalide. When approximately one mole of the aforesaid aliphatic compound is reacted per mole of phosphorus trihalide the product consists essentially of a mono-($\beta$-haloaliphatic)-ester of a monomeric di-halogen substituted acid of phosphorus. Similarly, when approximately two moles of such aliphatic compound are reacted per mole of phosphorus trihalide the product is essentially a di-($\beta$-haloaliphatic)-ester of a monomeric mono-halogen substituted acid of phosphorus.

The presence of the amine in the above process results in a number of benefits including (1) elimination of side reactions, (2) increases yield, (3) improved reaction start-up, that is, reduction in time normally required for reaction to be initiated, (4) attainment of maximum rate of reaction, (5) provision of reaction susceptible of easy control, (6) reduction in fire hazard, normally tending to result from build-up of unreacted reagents such as ethylene oxide, propylene oxide, etc., and (7) provision of products of higher purity than normally obtainable.

The amine used in my process can be any amine capable of forming salts with halogen acids such as HCl. Although polyamines are satisfactory, I prefer to use monoamines and particularly tertiary monoamines as these are especially useful in conducting my process as they are less susceptible of forming complexes or reacting in other ways with the phosphorus halide reagents used. Trialkyl amines are particularly preferred as they result in the greatest overall yield and highest purity of product.

I use catalytic quantities of amine in conducting my process. In other words, my process is conducted in the presence of an amount of amine sufficient to promote both (1) prompt reaction start-up, evidenced by a decided increase in temperature commonly termed a temperature "kick" and (2) completeness of reaction which may be determined by analysis of the product of the reaction, yet insufficient to cause cessation of reaction evidenced by a temperature drop. Generally speaking, the amine catalyst should be mixed with the aliphatic reagent of the above general formula so that the resulting mixture can be caused to react with the phosphorus trihalide. This prevents over-concentration of the catalyst in the reaction vessel thereby avoiding "killing" the reaction. The precise amount of amine so used appears to be dependent at least in part upon the purity of the reactants and is thus not susceptible of uniform numerical definition. Nevertheless, with commercial grade alkylene oxides and sulfides and the other aliphatic compounds of the above formula which are subjected to my process, which compounds are usually of 98 percent purity or higher, the amount of amine used is generally such that there is from about 0.001 to about 0.44 percent by weight of nitrogen present.

To prepare mono- and di-($\beta$-haloaliphatic)-esters of monomeric halogen substituted acids of trivalent phosphorus my process involves reacting at a temperature between about $-10°$ C. and about $100°$ C. in the presence of an amine as catalyst, an aliphatic compound of the formula

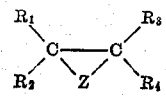

in which $R_1$, $R_2$, $R_3$, and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms; and Z is selected from the group consisting of oxygen and sulfur, with a trivalent phosphorus trihalide, said aliphatic compound being present in amount equal to that required to react with no more than two atoms of halogen per molecule of said phosphorus trihalide. Another embodiment of my invention is to conduct a somewhat similar process using a pentavalent phosphorus tri-halide. In this manner, mono- or di-($\beta$-haloaliphatic)-esters of monomeric halogen substituted acids of pentavalent phosphorus are formed depending upon the amount of aliphatic reagent reacted with the pentavalent phosphorus trihalide. To obtain the mono- substituted esters approximately equimolar concentrations of these reagents are used. In contrast, two moles of the aforesaid aliphatic compound is reacted with each mole of pentavalent phosphorus trihalide when preparing the corresponding di-($\beta$-halo-aliphatic)-esters. In each instance, the amine catalyst used is as described above and in the amounts above stated.

The trivalent phosphorus trihalides used in preparing the mono- and di-($\beta$-haloaliphatic)-esters of monomeric halogen substituted acids of trivalent phosphorus are exemplified by phosphorus trifluoride, phosphorus trichloride, phosphorus tribromide, phosphorus triiodide, phosphorus bromide dichloride, and the like. If desired, mixtures of such compounds may be used. The corresponding esters of the monomeric acids of pentavalent phosphorus are prepared from pentavalent phosphorus trihalides of the formula $X_3P=Z$ where each X is the same or different halogen and Z is oxygen or sulfur. Phosphoryl trifluoride, phosphoryl trichloride, phosphoryl tribromide, phosphoryl triiodide, thionophosphoryl trifluoride, thionophosphoryl trichloride, thionophosphoryl tribromide, thionophosphoryl triiodide, phosphoryl dibromide iodide, and thionophosphoryl dichloride bromide serve as examples.

The present embodiments of my invention will be still further apparent from the following illustrative examples in which all parts and percentages are by weight.

Example I

The reaction equipment consists of a reactor equipped with temperature regulating and stirring means. To this reactor continuously flushed with anhydrous nitrogen is charged 1950 parts of phosphorus trichloride of commercial purity. Two parts of triethyl amine is added to 1684 parts of commercial grade 1,2-propylene oxide and the mixture is then introduced into the reactor maintained at 35° C. and atmospheric pressure. The time of addition is regulated such that the total amount of propylene oxide is added after four hours. Di-($\beta$-chloropropyl)-monochlorophosphite is obtained in high yield.

Example II

The procedure of Example I is repeated with the exception that 842 parts of 1,2-propylene oxide is used, and the pressure is 8 inches of mercury above atmospheric. The product is predominantly ($\beta$-chloropropyl)-dichlorophosphite.

Example III

Using the reaction equipment of Example I flushed with dry nitrogen gas, 88 parts of ethylene oxide containing 0.2 part of trimethyl amine is reacted with 271 parts of phosphorus tribromide. A six-hour cycle is used while maintaining the temperature at 0° C. yielding di-($\beta$-bromoethyl)-monobromophosphite.

Example IV

While maintaining a pressure of 10 inches of mercury above atmospheric in the reaction vessel 88 parts of phosphorus trifluoride is charged therein. One part of tri-n-butyl amine is added to 116 parts of 1,2-propylene oxide and this mixture is then introduced into the reactor over a period of six hours. The temperature of the reactor is maintained at 10° C. during this time. A good yield of di-($\beta$-fluoropropyl)-fluorophosphite is obtained.

Example V

The procedure of Example I is repeated except that 72 parts of 1,2-butylene oxide is reacted with 412 parts of phosphorus triiodide at a temperature of 55° C. The use of the triethyl amine catalyst enables a substantial yield of ($\beta$-iodobutyl)-diiodophosphite.

Example VI

Two hundred seventy one parts of phosphorus tribromide and 0.01 part of triisopropyl amine are charged into the reactor. Fifty eight parts of 1,2-propylene oxide of commercial purity containing 0.1 part of triisopropyl amine is then introduced portionwise into the reactor maintained at a temperature of 35° C. The product is predominantly ($\beta$-bromopropyl)-dibromophosphite.

Example VII

To 392 parts of stilbene oxide (symmetrical diphenyl ethylene oxide) is added 0.3 part of N,N'-di-sec-butyl-p-phenylene diamine. The treated stilbene oxide is then introduced into the reaction vessel containing 271 parts of phosphorus tribromide. The temperature of the vessel is maintained at a temperature of 60° C. and a pressure of 4 inches of mercury above atmospheric during the period of addition of seven hours. A good yield of di-($\alpha$-phenyl-$\beta$-bromo-$\beta$-phenylethyl)-bromophosphite is obtained.

Example VIII

To the reaction vessel is added 137 parts of phosphorus trichloride. 148 parts of 1,2-propylene sulfide containing 0.2 part of N-methyl aniline is then introduced into the reaction vessel over a period of three hours while maintaining a temperature of 30° C. On completion of reaction di-($\beta$-chloropropyl)-chlorodithiophosphite remains in high yield.

Example IX

To the reaction equipment described in Example I is added 270 parts of phosphorus tribromide. 120 parts of styrene oxide containing 0.1 part of dodecyl amine is then introduced into the reactor during a period of four hours while maintaining the temperature at 95° C. and the pressure at 8 inches of mercury above atmospheric. An appreciable yield of a product containing predominantly ($\beta$-bromo-$\beta$-phenylethyl)-dibromophosphite is obtained.

Example X

While maintaining a pressure of five inches over mercury above atmospheric in the reaction vessel 88 parts of phosphorus trifluoride is charged therein. 0.3 part of aniline is added to 120 parts of ethylene sulfide and this mixture is introduced into the reactor over a period of six hours. During this time the temperature is maintained at 5° C. Di-($\beta$-fluoroethyl)-fluorodithiophosphite is obtained in good yield.

Example XI 412 parts of phosphorus triiodide is introduced into the reaction vessel. 0.3 part of di-n-amyl amine is added to 368 parts of epiiodohydrin (3-iodo-1,2-propylene oxide). This mixture is then introduced into the reaction vessel at a rate such that it requires three hours for complete addition. Throughout this time the temperature is maintained at 80° C. Di-($\beta$-$\gamma$-diiodopropyl)-iodo phosphite is obtained.

Example XII

The procedure of Example I is repeated with the exception that 2150 parts of phosphoryl trichloride is used as the phosphorus reagent. A good yield of di-($\beta$-chloropropyl)-chlorophosphate is obtained.

Example XIII

The procedure of Example I is repeated with the exception that 2366 parts of thionophosphoryl trichloride is used as the phosphorus reactant. The product is primarily di-(β-chloropropyl)-chlorothionophosphate.

Example XIV

Using the reaction equipment of Example I 60 parts of ethylene sulfide containing 0.1 part of ethanol amine is reacted with 103 parts of phosphoryl trifluoride. A six-hour cycle is used while maintaining the temperature at 30° C. A substantial yield of (β-fluoroethyl)-difluoromonothiophosphate is obtained.

Example XV

To 148 parts of 1,2-propylene sulfide is added 0.3 part of N,N-diethyl aniline. The treated 1,2-propylene sulfide is then introduced into the reactor charged with 303 parts of thionophosphoryl tribromide over a period of seven hours. During this time the temperature is maintained at 30° C. The product comprises predominantly di-(β-bromopropyl)-bromodithiothionophosphate.

Example XVI

To the reactor is charged 153 parts of phosphoryl trichloride. Then is introduced 88 parts of ethylene oxide containing 0.1 part of pyridine, the period of addition being three hours. During this time the temperature is maintained at −5° C. A good yield of di-(β-chloroethyl)-chlorophosphate is formed.

Example XVII 93 parts of epichlorohydrin containing 0.1 part of triethyl amine is reacted with 150 parts of phosphoryl trichloride. The epichlorohydrin is introduced over a period of six hours into the reaction vessel maintained at a temperature of 15° C. whereby (β-γ-dichloropropyl)-dichlorophosphate is obtained in good yield.

Example XVIII 240 parts of styrene oxide is reacted with 153 parts of phosphoryl trichloride at 0° C. 0.5 part of tri-n-octyl amine is used as catalyst for the reaction which is controlled by adding the styrene oxide containing the amine over a period of six hours. A good yield of di-(β-chloro-β-phenylethyl)-chlorophosphate is obtained.

The above examples illustrate the modes of conducting this invention. Among the numerous variations which can be used in obtaining the advantages of this invention is the technique of maintaining a "heel" in the reactor of the product of a previous reaction when that product is the same as being prepared. Although such a technique is not essential, it frequently further hastens the start-up of the reaction. Another helpful modification is to add a very small amount of amine catalyst to the phosphorus trihalide reagent contained in the reaction vessel prior to introduction of amine-containing aliphatic reagent as described herein. The amount of amine so used, which is equivalent to about 0.001 percent by weight of nitrogen based on the amount of phosphorus reagent used, promotes still further the initiation of reaction. Other variations will be apparent to one skilled in the art.

My process can be conducted either as a batch or continuous process. For a continuous operation separate streams of phosphorus trihalide and alkylene oxide or sulfide containing amine catalyst are introduced into suitable reaction equipment possessing temperature regulating means such as a heat exchanger. The reactor may be a tubular or coil-type or it may be of the continuous pot-type variety. In operation, the temperature may be controlled within the range of −10° to 100° C. by means of temperature regulating means or the reagent streams may be adjusted to reaction temperature prior to introduction into the reactor. Contact time is dependent upon the particular reactants used and the type of reactor and thus falls within the range of about 30 seconds to about one hour. In most cases, a contact time of from 10 to 30 minutes is most satisfactory.

As many widely differing variations of the present invention are possible without departing from the spirit and scope thereof, it is not intended that this invention be limited except as defined by the appended claims.

I claim:

1. Process of preparing β-haloaliphatic esters of monomeric halogen-substituted acids of phosphorus possessing from 1 to 2 halogen atoms directly bonded to phosphorus, which comprises reacting at a temperature between about −10° C. and about 100° C. and in the presence of a catalytic quantity of a basic amine as catalyst, an aliphatic compound of the formula

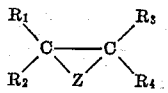

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a phosphorus trihalide selected from the group consisting of trivalent phosphorus trihalides, phosphoryl trihalides and thionophosphoryl trihalides, said process being further characterized in that said basic amine is selected from the group consisting of alkyl amines, mononuclear aryl amines, organic heterocyclic nitrogen-containing amines and lower alkanol amines and that said aliphatic compound is present in amount equal to that required to react with no more than two atoms of halogen per molecule of said phosphorus trihalide.

2. Process of preparing β-haloaliphatic esters of monomeric halogen-substituted acids of trivalent phosphorus possessing from 1 to 2 halogen atoms directly bonded to phosphorus which comprises reacting at a temperature between about −10° C. and about 100° C. and in the presence of a catalytic quantity of a basic amine as catalyst, an aliphatic compound of the formula

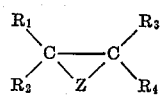

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a trivalent phosphorus trihalide, said process being further characterized in that said basic amine is selected from the group consisting of alkyl amines, mononuclear aryl amines, organic heterocyclic nitrogen-containing amines and lower alkanol amines, and that said aliphatic compound is present in amount equal to that required to react with no more than two atoms of halogen per molecule of said trivalent phosphorus trihalide.

3. Process of preparing β-haloaliphatic esters of monomeric halogen-substituted acids of pentavalent phosphorus possessing from 1 to 2 halogen atoms directly bonded to phosphorus which comprises reacting at a temperature between about −10° C. and about 100° C. and in the presence of a catalytic quantity of a basic amine as catalyst, an aliphatic compound of the formula

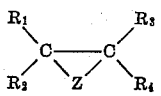

in which $R_1$, $R_2$, $R_3$ and $R_4$ are selected from the group consisting of hydrogen, alkyl containing from 1 to about 18 carbon atoms, aryl containing up to about 10 carbon atoms and haloalkyl containing up to 3 halogen atoms and from 1 to 10 carbon atoms, and Z is selected from the group consisting of oxygen and sulfur; with a pentavalent phosphorus trihalide selected from the group consisting of phosphoryl trihalides and thionophosphoryl trihalides, said process being further characterized in that said basic amine is selected from the group consisting of alkyl amines, mononuclear aryl amines, organic heterocyclic nitrogen-containing amines and lower alkanol amines and that said aliphatic compound is present in amount equal to that required to react with no more than two atoms of halogen per molecule of said pentavalent phosphorus trihalide.

4. The process of claim 1 further defined in that said aliphatic compound is present in amount equal to that required to react with two atoms of halogen per molecule of said phosphorus trihalide thereby providing β-haloaliphatic esters of monomeric halogen substituted acids of phosphorus possessing one halogen atom directly bonded to phosphorus.

5. The process of claim 1 further defined in that said aliphatic compound is present in amount equal to that required to react with one atom of halogen per molecule of said phosphorus trihalide thereby providing β-haloaliphatic esters of monomeric halogen substituted acids of phosphorus possessing two halogen atoms directly bonded to phosphorus.

6. The process of claim 1 further defined in that said aliphatic compound is present in amount equal to that required to react with two atoms of halogen per molecule of said phosphorus trihalide thereby providing β-haloaliphatic esters of monomeric halogen-substituted acids of phosphorus possessing one halogen atom directly bonded to phosphorus, and in that said basic amine is a trialkyl amine.

7. The process of claim 1 further defined in that said aliphatic compound is present in amount equal to that required to react with one atom of halogen per molecule of said phosphorus trihalide thereby providing β-haloaliphatic esters of monomeric halogen-substituted acids of phosphorus possessing two halogen atoms directly bonded to phosphorus, and in that said basic amine is a trialkyl amine.

8. The process of claim 2 wherein said trivalent phosphorus trihalide is phosphorus trichloride.

9. The process of claim 3 wherein said pentavalent phosphorus trihalide is phosphoryl trichloride.

10. The process of claim 3 wherein said pentavalent phosphorus trihalide is thionophosphoryl trichloride.

References Cited in the file of this patent

UNITED STATES PATENTS

| | | |
|---|---|---|
| 1,936,985 | Lommel et al. | Nov. 28, 1933 |
| 2,157,164 | Daly et al. | May 9, 1939 |
| 2,536,647 | Kosolapoff | Jan. 2, 1951 |
| 2,610,978 | Lanham | Sept. 16, 1952 |
| 2,678,309 | Gorder et al. | May 11, 1954 |
| 2,724,719 | Markley et al. | Nov. 22, 1955 |